US011496938B1

(12) United States Patent
Malhotra et al.

(10) Patent No.: US 11,496,938 B1
(45) Date of Patent: Nov. 8, 2022

(54) USER EQUIPMENT (UE) HANDOVER BASED ON AN ACTIVE MEDIA SESSION

(71) Applicant: T-Mobile Innovations LLC, Overland Park, KS (US)

(72) Inventors: Rajil Malhotra, Olathe, KS (US); Ramesh Kumar Golla, Ashburn, VA (US); Anuj Sharma, Broadlands, VA (US); Anil Kumar Mariyani, Ashburn, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 17/155,904

(22) Filed: Jan. 22, 2021

(51) Int. Cl.
*H04W 4/00* (2018.01)
*H04W 36/08* (2009.01)
*H04W 36/00* (2009.01)
*H04W 48/16* (2009.01)
*H04W 76/27* (2018.01)
*H04W 8/08* (2009.01)
*H04W 8/24* (2009.01)

(52) U.S. Cl.
CPC ............ *H04W 36/08* (2013.01); *H04W 8/08* (2013.01); *H04W 8/24* (2013.01); *H04W 36/0058* (2018.08); *H04W 48/16* (2013.01); *H04W 76/27* (2018.02)

(58) Field of Classification Search
CPC ......... H04W 8/08; H04W 8/24; H04W 8/245; H04W 36/0055; H04W 36/0058; H04W 36/0061; H04W 36/08; H04W 36/18; H04W 36/20; H04W 36/24; H04W 36/30; H04W 48/16; H04W 48/18; H04W 76/27
See application file for complete search history.

(56) References Cited

U.S. PATENT DOCUMENTS

| 9,433,030 | B2 | 8/2016 | Shukair et al. |
| 9,467,907 | B2 | 10/2016 | Balabhadruni et al. |
| 10,567,943 | B2 | 2/2020 | Edge |
| 2011/0176512 | A1* | 7/2011 | Sun ........................ H04W 36/08 370/328 |
| 2015/0038143 | A1 | 2/2015 | Kilpatrick, II et al. |

(Continued)

FOREIGN PATENT DOCUMENTS

| EP | 3720236 A1 | 10/2020 |
| WO | 2019190365 A1 | 10/2019 |

*Primary Examiner* — Matthew W Genack

(57) ABSTRACT

A wireless communication network comprises a wireless UE, a source access node, a target access node, and a network controller. The UE identifies an active media session, a UE fallback capability, and a network fallback availability. The UE measures a signal metric for the target access node and indicates the signal metric and UE fallback capability to the source access node. The source access node receives the indication the signal metric and the UE fallback capability. The source access node receives an access modification message for the UE from the wireless network controller. In response, the source access node initiates the hand over and transfers a handover message to the network controller. The network controller receives the handover message, transfers a handover request to the target access node, receives an acceptance from the target access node, and transfers a handover command for the wireless UE to the source access node.

20 Claims, 10 Drawing Sheets

(56) References Cited

U.S. PATENT DOCUMENTS

| | | | | |
|---|---|---|---|---|
| 2015/0049707 A1* | 2/2015 | Vajapeyam | ........... | H04W 76/16 |
| | | | | 370/329 |
| 2019/0335534 A1 | 10/2019 | Atarius et al. | | |
| 2020/0112887 A1 | 4/2020 | Kwok et al. | | |
| 2020/0154390 A1* | 5/2020 | Kim | ...................... | H04W 60/00 |
| 2020/0245195 A1* | 7/2020 | Zhu | ...................... | H04W 36/12 |
| 2020/0383005 A1* | 12/2020 | Wu | ................... | H04W 28/0268 |

* cited by examiner

USER EQUIPMENT (UE) HANDOVER BASED ON AN ACTIVE MEDIA SESSION

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless access nodes are connected to the wireless network cores over backhaul data links.

The wireless access nodes comprise Radio Units (RUs), Distributed Units (DUs) and Centralized Units (CUs). The RUs are mounted at elevation and have antennas, modulators, signal processor, and the like. The RUs are connected to the DUs which are usually nearby network computers. The DUs handle lower wireless network layers like the Physical Layer (PHY) and Media Access Control (MAC). The DUs are connected to the CUs which are larger computer centers that are closer to the network cores. The CUs handle higher wireless network layers like the Radio Resource Control (RRC) and Packet Data Convergence Protocol (PDCP). The CUs are coupled to network functions in the network cores. Exemplary network functions include Access and Mobility Management Functions (AMFs), Session Management Functions (SMFs), and User Plane Functions (UPFs).

A wireless user device generates a Session Initiation Protocol (SIP) invite message to initiate a voice call with another wireless user device. The wireless user device transfers the SIP invite messages to a wireless access node. The wireless access node routes the SIP invite messages to a wireless network core. The wireless network core routes the SIP invite message to an Internet Protocol Multimedia Subsystem (IMS). The IMS transfers a new SIP invite message to the other wireless user device to setup the voice call. When the wireless access node does not support the voice call, the wireless access node directs the wireless user device to hand over to another wireless access node that supports the voice call in a process called "fallback". Unfortunately, current fallback processes inefficiently require excessive signaling and are ineffective because they take too much time. Unfortunately, the wireless access nodes do not effectively and efficiently fallback the wireless user devices when the wireless user devices initiate voice calls.

TECHNICAL OVERVIEW

A wireless communication network is configured to hand over a wireless User Equipment (UE) from a source access node to a target access node. The wireless communication network comprises a wireless UE, a source access node, a target access node, and a network controller. The wireless UE identifies an active media session, a UE fallback capability, and a network fallback availability. In response, the wireless UE measures a signal metric for the target access node. The wireless UE wirelessly indicates the signal metric and the UE fallback capability to the source access node. The source access node wirelessly receives the indication of the signal metric and the UE fallback capability from the wireless UE. The source access node receives an access modification message for the wireless UE from the wireless network controller. In response, the source access node initiates the handover based on the signal metric, the UE capability, and the access modification message. The source access node transfers a handover message to the wireless network controller. The wireless network controller receives the handover message and transfers a handover request to the target access node. The wireless network controller receives a handover acceptance from the target access node and transfers a handover command for the wireless UE to the source access node.

DETAILED DESCRIPTION

Figure 1:
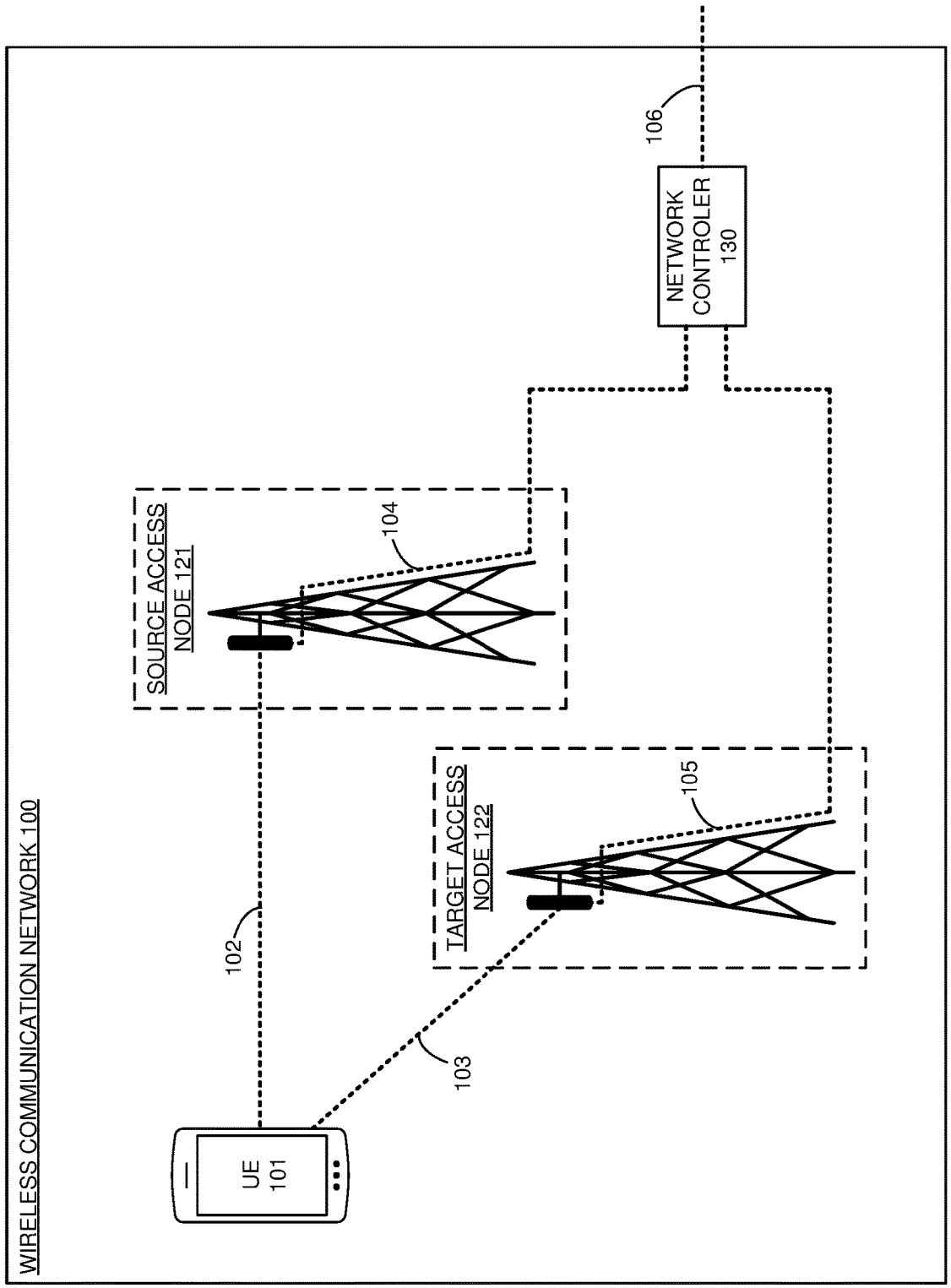
FIG. 1 illustrates a wireless communication network that hands over a wireless User Equipment (UE) based on an active media session.

FIG. 1 illustrates wireless communication network 100. Wireless communication network 100 is configured to hand over wireless User Equipment (UE) 101 from source access node 121 to target access node 122. Wireless communication network 100 provides wireless data services to UE 101 like voice calling, video conferencing, and/or some other type of wireless networking product. Wireless communication network 100 comprises wireless UE 101, links 102-106, source access node 121, target access node 122, and wireless network controller 130.

Various examples of network operation and configuration are described herein. In some examples, wireless UE 101 identifies an active media session, a UE fallback capability, and a network fallback availability. For example, UE 101 may send a SIP invite message to initiate a voice call and responsively identify an active media session. In response to the active media session, the UE fallback capability, and the network fallback availability, wireless UE 101 measures a signal metric for target access node 122. Wireless UE 101 wirelessly indicates the signal metric and the UE fallback capability to source access node 121. Source access node 121 wirelessly receives the indication of the signal metric and the UE fallback capability from wireless UE 101. Source access node 121 receives an access modification message for UE 101 from wireless network controller 130. In response, source access node 121 initiates a hand over for UE 101 based on the signal metric, the UE capability, and the access modification message. Source access node 121 transfers a handover message to wireless network controller 130. Wireless network controller 130 receives the handover message and transfers a handover request to target access node 122. Wireless network controller 130 receives a handover acceptance from target access node 122 and transfers a handover command for wireless UE 101 to source access node 130. Advantageously, source access node 121 reduces the amount of signaling and decreases the media session setup time to effectively and efficiently fallback UE 101 when UE 101 identifies an active media session.

UE 101, source access node 121, and target access node 122 wirelessly communicate over wireless links using Radio Access Technologies (RATs) like Fifth Generation New Radio (5GNR), Long Term Evolution (LTE), Institute of Electrical and Electronic Engineers (IEEE) 802.11 (WIFI), Low-Power Wide Area Network (LP-WAN), and/or some other wireless protocol. The RATs use electromagnetic frequencies in the low-band, mid-band, high-band, or some other portion of the electromagnetic spectrum. Access nodes 121-122 and wireless network controller 130 communicate over backhaul links that use metallic links, glass fibers, radio channels, or some other communication media. The backhaul links use IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

UE 101 comprises a phone, vehicle, sensor, robot, computer, or some other data appliance with wireless communication circuitry. Access nodes 121-122 are depicted as towers but access nodes 121-122 may use other mounting structures or no mounting structure at all. Access nodes 121-122 may comprise Fifth Generation Radio Access Networks (5G RANs), LTE RANs, gNodeBs, eNodeBs, NB-IoT access nodes, LP-WAN base stations, wireless relays, and/or some other wireless network transceivers. UE 101 and access nodes 121-122 comprise antennas, amplifiers, filters, modulation, analog/digital interfaces, and microprocessors. UE 101, access nodes 121-122, and wireless network controller 130 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of RAN 110 as described herein. In some examples, wireless network controller comprises Access and Mobility Management Functions (AMFs), Session Management Functions (SMFs), Gateways (GWs), and/or other network elements and network functions that are hosted by a Network Function Virtualization Infrastructure (NFVI).

Figure 2:
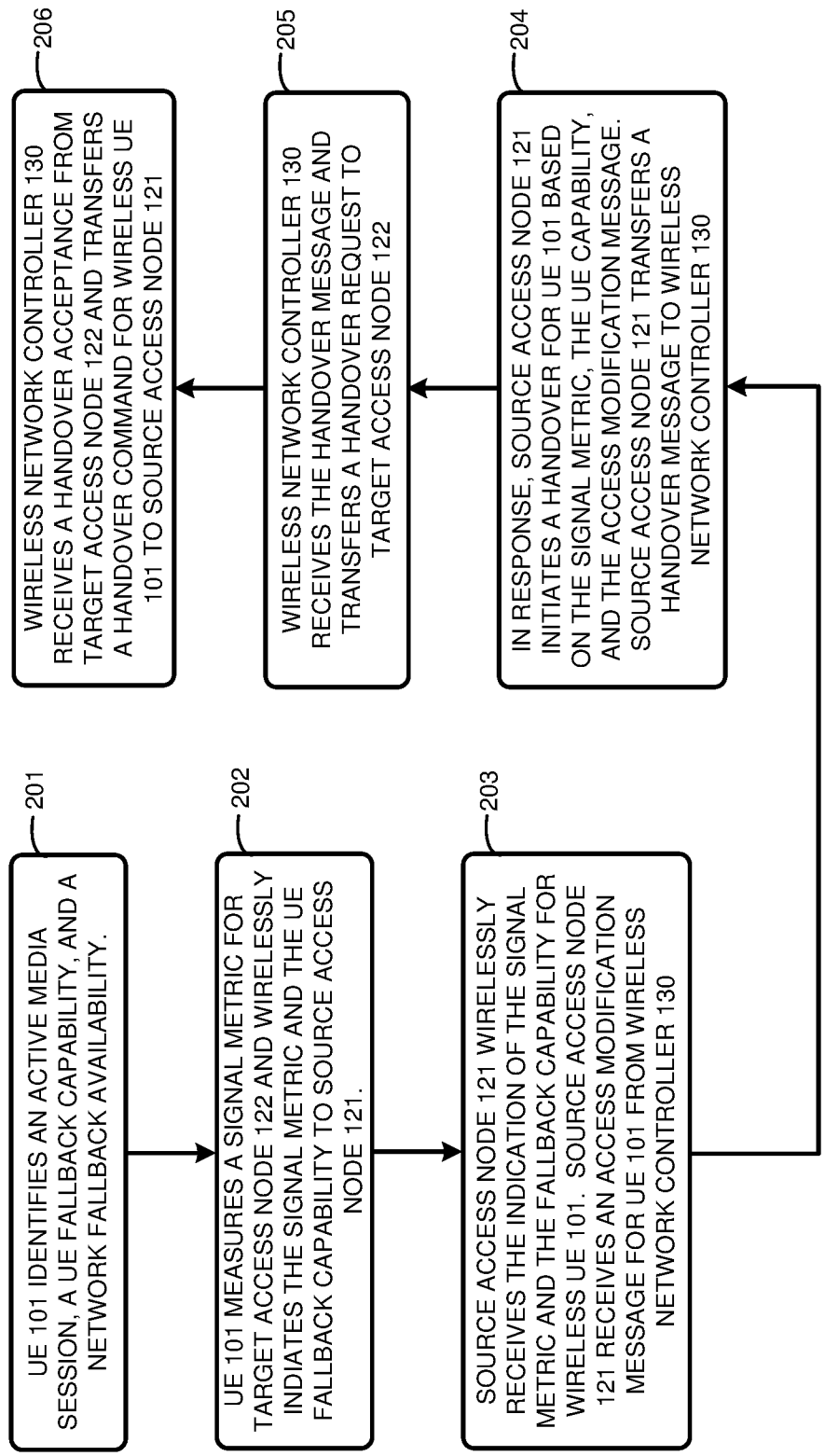
FIG. 2 illustrates the operation of the wireless communication network to hand over the wireless UE based on the active media session.

FIG. 2 illustrates the operation of wireless communication network 100 to hand over UE 101 based on an active media session. The operation is exemplary and may vary in other examples. UE 101 identifies an active media session, a UE fallback capability, and a network fallback availability (201). UE 101 measures a signal metric for target access node 122 and wirelessly indicates the signal metric and the UE fallback capability to source access node 121 (202). Source access node 121 wirelessly receives the indication of the signal metric and the fallback capability for wireless UE 101 (203). Source access node 121 receives an access modification message for UE 101 from wireless network controller 130 (203). For example, source access node 121 may receive an access modification message to setup a video conference media session for UE 101. In response, source access node 121 initiates a handover for UE 101 based on the signal metric, the UE capability, and the access modification message (204). Source access node 121 transfers a handover message to wireless network controller 130 (204). Wireless network controller 130 receives the handover message and transfers a handover request to target access node 122 (205). Wireless network controller 130 receives a handover acceptance from target access node 122 and transfers a handover command for wireless UE 101 to source access node 121 (206).

Figure 3:
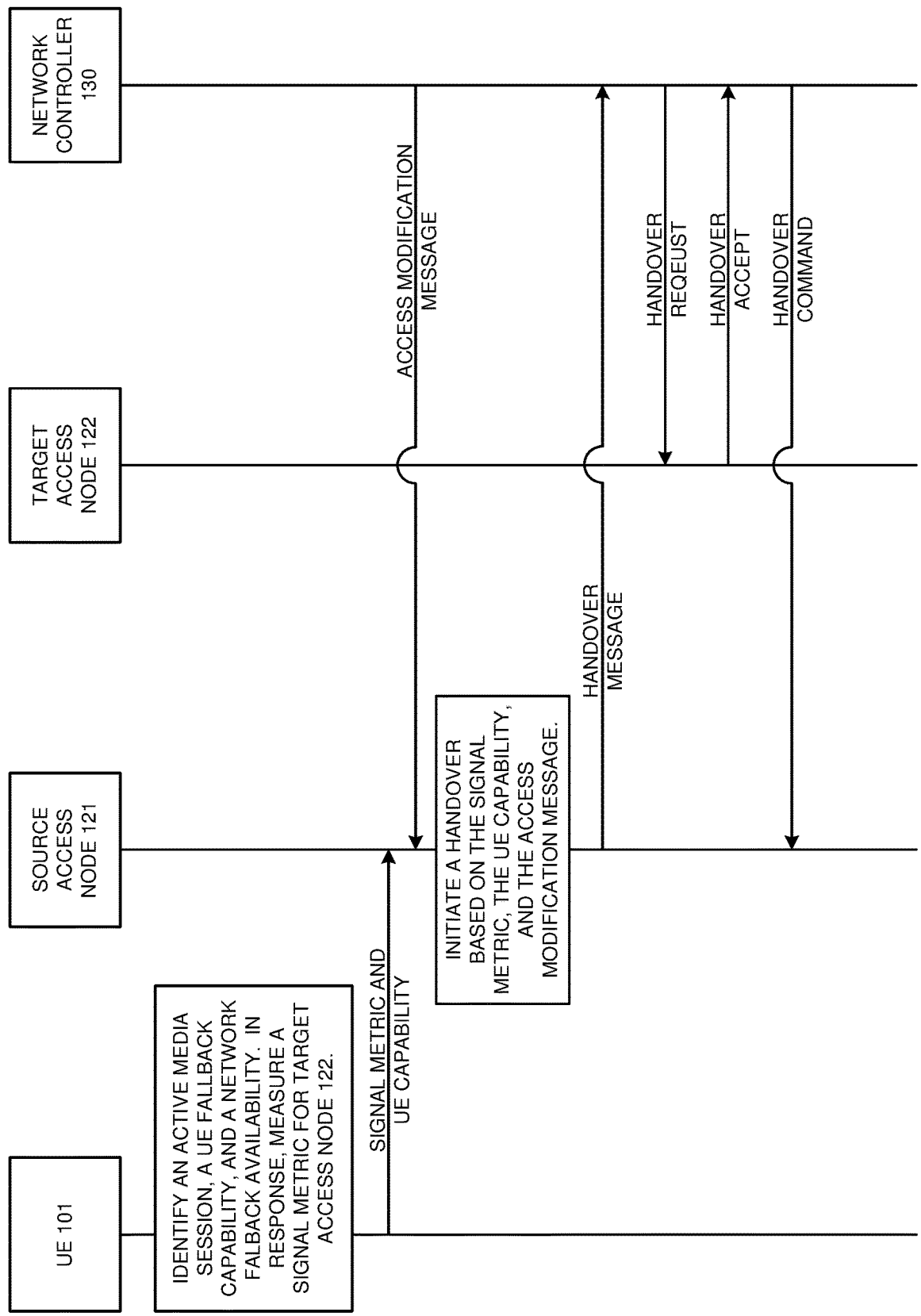
FIG. 3 illustrates the operation of the wireless communication network to hand over the wireless UE based on the active media session.

FIG. 3 illustrates the operation of wireless communication network 100 to hand over wireless UE 101 based on an active media session. The operation is exemplary and may vary in other examples. UE 101 identifies an active media session, a UE fallback capability for UE 101, and a network fallback availability. For example, UE 101 may receive a configuration message from source access node 121 that fallback to target access node 122 is available and determine network fallback availability. In response to the active media session, the UE fallback capability, and the network fallback availability, UE 101 measures a signal metric for target access node 121. The signal metric may comprise signal strength, signal quality, and/or some other signal metric. UE 101 transfers the signal metric and the UE fallback capability to source access node 121. Source access node 121 receives an access modification message from wireless network controller 130. In some examples, the wireless network controller 130 transfers the access modification request in response to UE 101 initiating the active media session.

Source access node 121 initiates a handover of UE 101 to source access node 122 in response to the signal metric for target access node 121, the UE fallback capability of UE 101, and the access modification message from network controller 130. Source access node 121 transfers a handover message for UE 101 to network controller 130. Network controller 130 receives the handover message and transfers a handover request to target access node 122 for UE 101 to attach to target access node 122. Network controller 130 receives a handover acceptance from target access node 122 and transfers a handover command for UE 101 to source access node 121.

Figure 4:
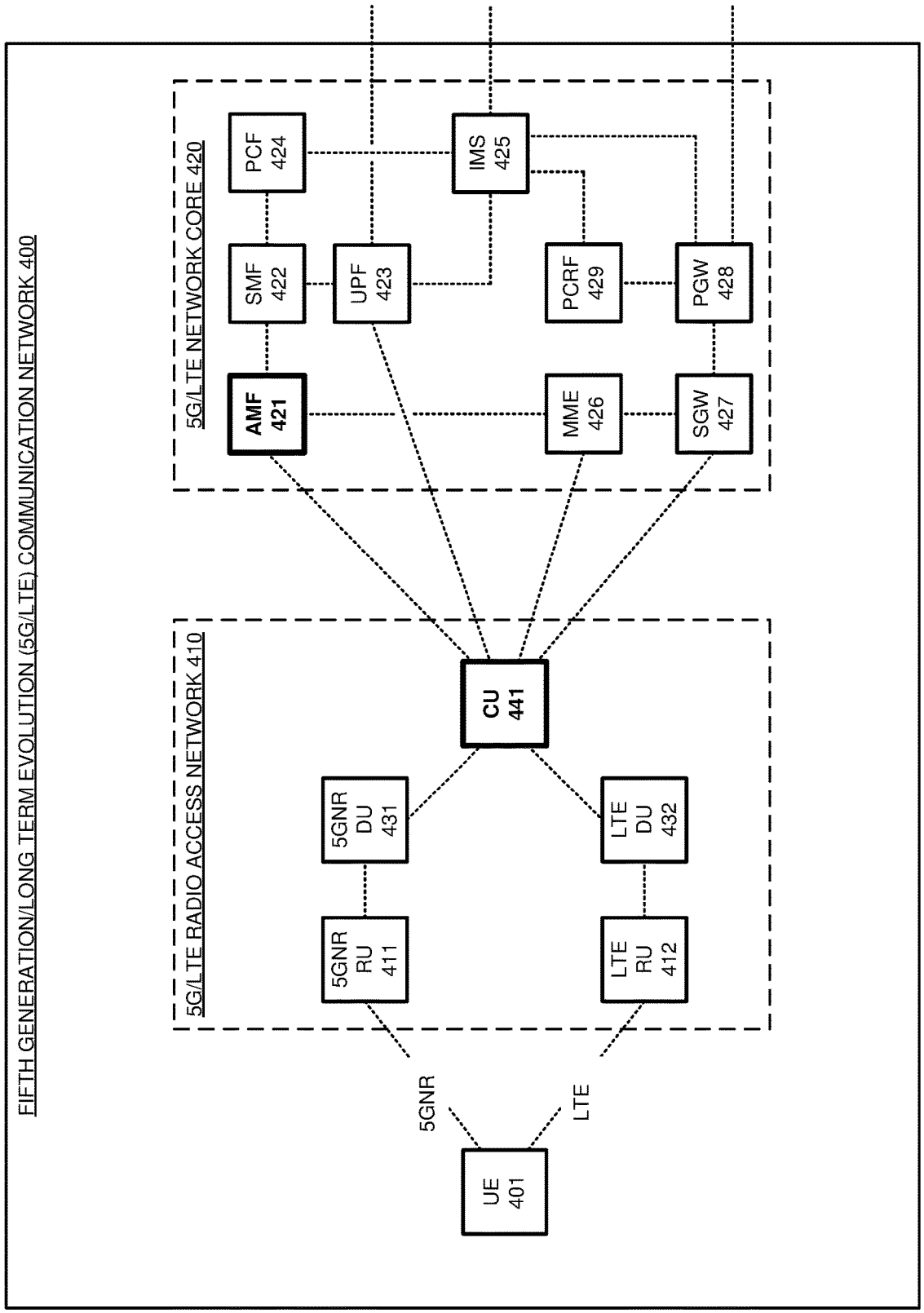
FIG. 4 illustrates a Fifth Generation/Long Term Evolution (5G/LTE) communication network that hands over a 5G/LTE UE based on an active Mobile Originated (MO) Internet Protocol Multimedia System (IMS) voice session.

FIG. 4 illustrates Fifth Generation/Long Term Evolution (5G/LTE) communication network 400 that hands over 5G/LTE User Equipment (UE) 401 based on an active media session. 5G/LTE communication network 400 comprises an example of wireless communication network 100, although network 100 may differ. 5G/LTE communication network 400 comprises 5G/LTE UE 401, 5G/LTE Radio Access Network (RAN) 410, and 5G/LTE network core 420. 5G/LTE RAN 410 comprises 5G Radio Unit (RU) 411, LTE RU 412, 5G Distributed Unit (DU) 431, LTE DU 432, and 5G/LTE Centralized Unit (CU) 441. 5G/LTE network core comprises Access and Mobility Management Function (AMF) 421, Session Management Function (SMF) 422, User Plane Function (UPF) 423, Policy Control Function (PCF) 424, Internet Protocol Multimedia Service (IMS) 425, Mobility Management Entity (MME) 426, Serving Gateway (SGW) 427, Packed Data Network Gateway (PGW) 428, and Policy and Charging Rules Function (PCRF) 429. Other network functions are typically present but are omitted for clarity.

UE 401 wirelessly attaches to RU 411 and transfers a registration request to CU 441 over RU 411 and DU 431. CU 441 transfers a registration request message for UE 401 to AMF 421. AMF 421 interacts other network functions to authenticate and authorize UE 401 for wireless data services. Responsive to the authentication and authorization, AMF 421 interacts with other network functions to select Quality-of-Service (QoS) metrics and network addresses for UE 401. AMF 421 determines that AMF 421 has an available N26 link to MME 426 and in response, that LTE fallback is available in 5G/LTE network core 420. AMF 421 transfers the network addresses, QoS metrics, and a registration accept message for UE 401 to CU 441. The registration accept message comprises a Radio Resource Control (RRC) reconfiguration message that indicates that LTE fallback is available. CU 441 transfers the network addressing, QoS metrics, and registration accept message to UE 401 over DU 431 and RU 411. CU 441 controls DU 431 and RU 411 to serve UE 401. UE 401 exchanges user signaling with AMF 421 and SMF 422 over RU 411, DU 431, and CU 441. UE 401 exchanges user data with UPF 423 over RU 411, DU 431, and CU 441.

UE 401 initiates a Mobile Originated (MO) IMS voice session. UE 401 transfers a Session Initiation Protocol (SIP) invite to CU 441 over RU 411 and DU 431. CU 441 transfers the SIP invite message to UPF 423. UPF 423 transfers the SIP invite to IMS 425. In response to sending the SIP invite and receiving the indication that LTE fallback is available, UE 401 measures Reference Signal Received Power (RSRP) and Reference Signal Strength Indication (RSSI) and/or some other signal metric for LTE RU 412. UE 401 determines Reference Signal Received Quality (RSRQ) for LTE RU 412 based on the RSSI and RSRP. UE 401 generates a measurement report that indicates the RSRQ for LTE RU 412 and indicates LTE fallback capability for UE 401. UE 401 wirelessly transfers the measurement report to CU 441 over RU 411 and DU 431. In response to SIP invite sent by UE 401, IMS 425 notifies PCF 424 of the MO IMS voice session initiated by UE 401. PCF 424 notifies SMF 422 and UPF 423 of the MO IMS voice session and SMF 422 notifies AMF 421. AMF 421 transfers a Packet Data Unit (PDU) session resource modification request to CU 441 to establish the MO IMS voice session for UE 401.

CU 441 receives the measurement report that indicates the RSRQ for LTE RU 412 and the LTE fallback capability for UE 401. CU 441 receives the session resource modification request from AMF 421 to establish the MO IMS voice session for UE 401. CU 441 determines that the RSRQ for LTE RU 412 is above a quality threshold. In response to the RSRQ for LTE RU 412, the LTE fallback capability for UE 401, and the session resource modification request, CU 441 rejects the session resource modification request and transfers a handover required message to AMF 421. The handover required message indicate a Physical Cell Identifier (PCI) as the handover target. AMF 421 transfers a handover request to MME 426 over N26 links to hand over UE 401.

MME 426 transfers a handover request to CU 441. CU 441 accepts the handover request and transfers a handover acceptance message to MME 426. MME 426 forwards the handover acceptance to AMF 421 and AMF 421 transfers a handover command to CU 441. CU 441 transfers the handover command to UE 401 over 5G DU 431 and 5G RU 411. UE 401 receives the handover command. UE 401 attaches to CU 441 over LTE RU 412 and LTE DU 432. CU 441 notifies MME 426 of the attachment. MME 426 interacts with SGW 427, PGW 428, and PCRF 429 to select Quality-of-Service (QoS) metrics and network addresses for UE 401 to establish the MO IMS voice session. In response, UE 401 establishes the MO IMS voice session with IMS 425 over LTE RU 412, LTE DU 432, and 5G/LTE CU 441.

Figure 5:
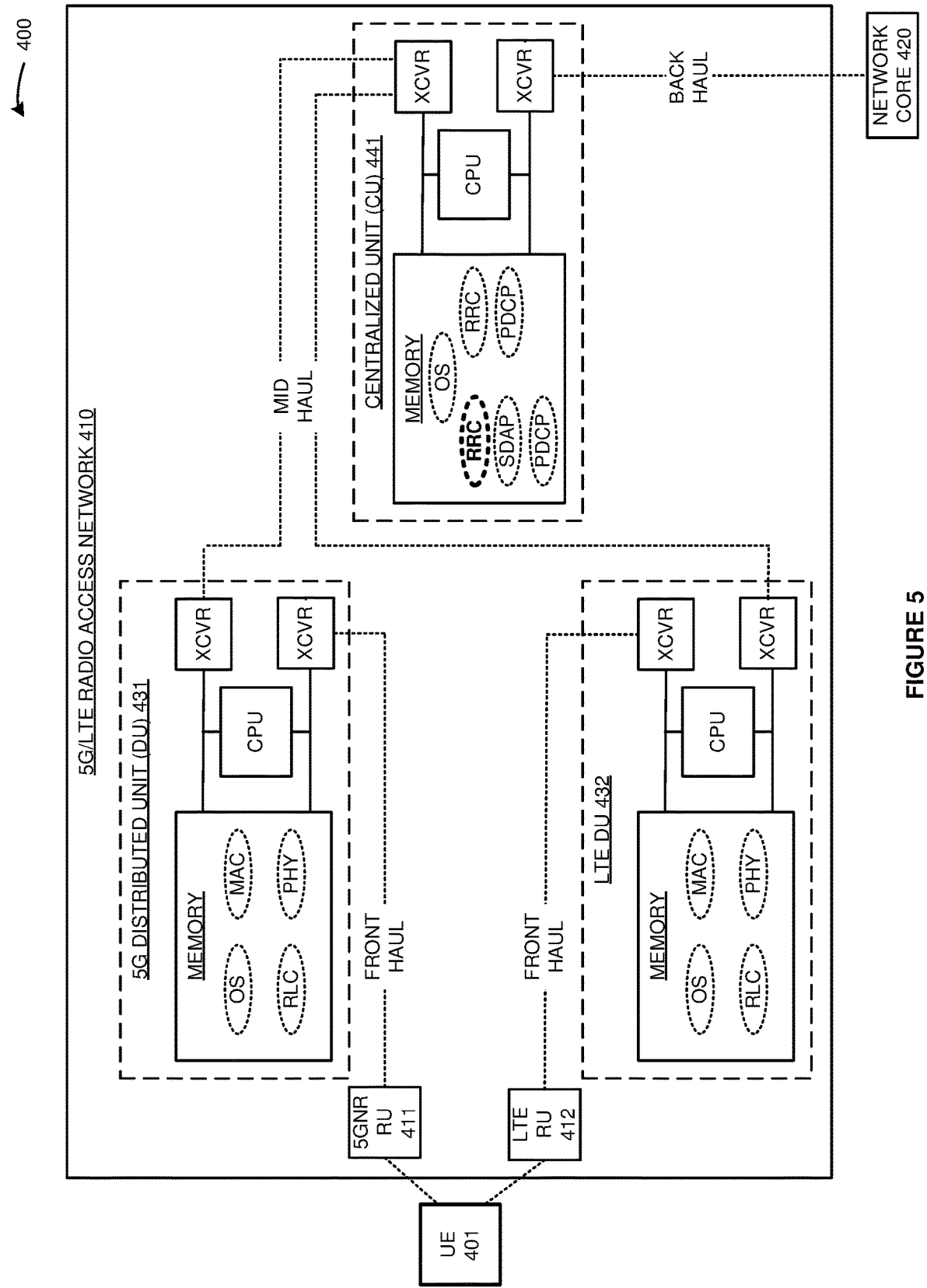
FIG. 5 illustrates 5G/LTE Distributed Units (DUs) and a 5G/LTE Centralized Unit (CU) that hand over the 5G/LTE UE based on the active MO IMS voice session.

FIG. 5 illustrates 5G DU 431, LTE DU 432 and 5G/LTE Centralized Unit (CU) 441 that hand over 5G/LTE UE 401 based on an active media session. DUs 431-432 and CU 441 comprise an example of access nodes 121-122, although access nodes 121-122 may differ. DUs 431-432 comprise memory, CPU, and transceivers that are coupled over bus circuitry. The memory in 5G DU 431 stores operating systems and 5GNR network applications like 5GNR Physical Layer (PHY), 5GNR Media Access Control (MAC), and 5GNR Radio Link Control (RLC). The memory in LTE DU 432 stores operating systems and LTE network applications like LTE Physical Layer (PHY), LTE Media Access Control (MAC), and LTE Radio Link Control (RLC). 5G/LTE CU 441 comprises memory, CPU, and transceivers that are coupled over bus circuitry. The memory in 5G/LTE CU 441 stores an operating system and network applications like 5GNR Packet Data Convergence Protocol (PDCP), 5GNR Service Data Adaptation Protocol (SDAP), 5GNR Radio Resource Control (RRC), LTE PDCP, and LTE RRC. A transceiver in 5G DU 431 is coupled to a transceiver in 5G RU 411 over front-haul links. A transceiver in LTE DU 432 is coupled to a transceiver in LTE RU 412 over front-haul links. Transceivers in DUs 431-432 are coupled to transceivers in CU 441 over mid-haul links. Transceivers in CU 441 are coupled to network core 420 over backhaul links.

RLC functions comprise Automatic Repeat Request (ARQ), sequence numbering and resequencing, segmentation and resegmentation. MAC functions comprise buffer status, power control, channel quality, Hybrid Automatic Repeat Request (HARQ), user identification, random access, user scheduling, and QoS. PHY functions comprise packet formation/deformation, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs). PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

UE 401 wirelessly attaches to RU 411 and transfers a registration request to the 5GNR RRC in CU 441 over 5G RU 411 and 5G DU 431. The 5GNR RRC in CU 441 transfers a registration request message for UE 401 to AMF 421 over backhaul links. The 5GNR RRC in receives network addresses, QoS metrics, and a registration accept message for UE 401 from AMF 421. The registration accept message indicates that LTE fallback is available in network core 421. The 5GNR RRC transfers the network addressing, QoS metrics, and registration accept message to the 5G RU 411 over 5G DU 431. 5G RU 411 wirelessly transfers the network addressing, QoS metrics, and registration accept message to UE 401.

The 5GNR SDAP in CU 441 receives a SIP invite from UE 401 over RU 411 and DU 431. The 5GNR SDAP in CU 441 transfers the SIP invite message to UPF 423. The 5GNR RRC in CU 441 receives a measurement report from UE 401 over 5G DU 431 and 5G RU 411. The measurement report indicates the RSRQ for LTE RU 412 and the LTE fallback capability for UE 401. The 5GNR RRC receives a session resource modification request from AMF 421 to establish an MO IMS voice session for UE 401. The 5GNR RRC determines that the RSRQ for LTE RU 412 is above a quality threshold. In response to the RSRQ for LTE RU 412 exceeding the quality threshold, the LTE fallback capability for UE 401, and the session resource modification request, the 5GNR RRC rejects the session resource modification request. The 5GNR RRC transfers a handover required message to AMF 421. The handover required message indicates a PCI for the LTE RRC in CU 441 as the handover target.

The LTE RRC in CU 441 receives a handover request from MME 426 to hand over UE 401. When wireless resources are available to serve UE 401, the LTE RRC accepts the handover request and transfers a handover acceptance message to MME 426. The 5GNR RRC in CU 441 receives a handover command from AMF 421. The 5GNR RRC transfers the handover command to 5G RU 411 over 5G DU 431. 5G RU 411 wirelessly transfers the handover command to UE 401. UE 401 receives the handover command and attaches to the LTE RRC in CU 441 over LTE RU 412 and LTE DU 432. The LTE RRC receives attachment signaling from UE 401 over LTE RU 412 and LTE DU 432. The LTE RRC notifies MME 426 of the attachment. In response, UE 401 establishes the MO IMS voice session with IMS 425 over LTE RU 412, LTE DU 432, and 5G/LTE CU 441.

Figure 6:
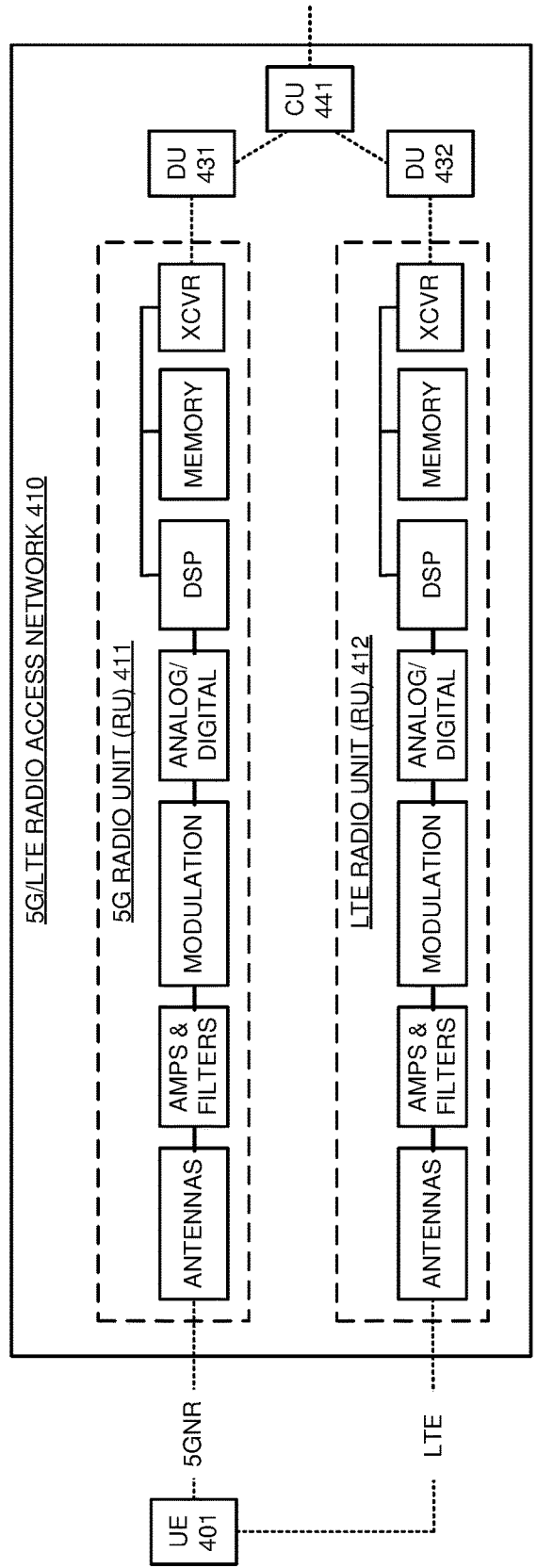
FIG. 6 illustrates 5G/LTE Radio Units (RUs) that hand over the 5G/LTE UE based on the active MO IMS voice session.

FIG. 6 illustrates 5G RU 411 and LTE RU 412 that hand over UE 401 based on an active media session. RUs 411-412 comprise an example of radios 121-122, although radios 121-122 may differ. RUs 411-412 comprise antennas, amplifiers, filters, modulation, analog-to-digital interfaces, DSP, memory, and transceivers (XCVRs) that are coupled over bus circuitry. UE 401 is wirelessly coupled to the antennas in RU 411 over 5GNR links. UE 410 is wirelessly coupled to antennas in RU 412 over LTE links. Transceivers in 5G RU 411 are coupled to transceivers in 5G DU 431 over fronthaul links like enhanced Common Public Radio Interface (eCPRI). Transceivers in LTE RU 412 are coupled to transceivers in DU 432 over fronthaul links like Common Public Radio Interface (CPRI). The DSP in RUs 411-412 execute their operating systems and radio applications to exchange 5GNR signals and LTE signals with UE 401 and to exchange 5GNR and LTE data units with DUs 431-432.

For the uplink, the antennas receive wireless signals from UE 401 transport uplink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequencies. The analog/digital interfaces convert the demodulated analog signals into digital signals for the DSP. The DSP transfers corresponding 5GNR and LTE symbols to DUs 431-432 over the transceivers.

For the downlink, the DSP receives downlink 5GNR and LTE symbols from DUs 431-432. The DSP processes the downlink 5GNR symbols to generate corresponding digital signals for the analog-to-digital interfaces. The analog-to-digital interfaces convert the digital signals into analog signals for modulation. Modulation up-converts the analog signals to their carrier frequencies. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to 5G/LTE UE 401 that transport the downlink 5GNR signaling and data and that transport the downlink LTE signaling and data.

Figure 7:
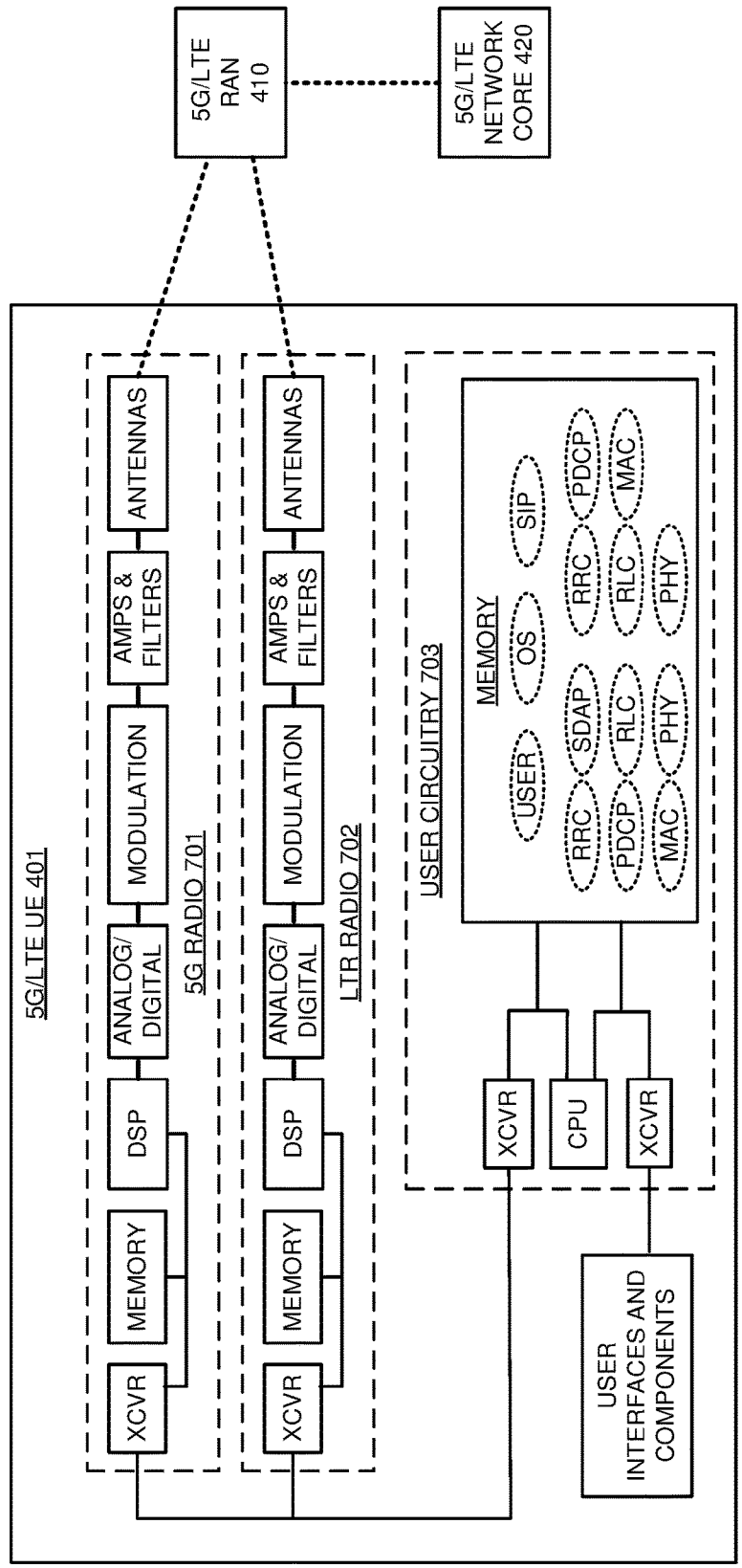
FIG. 7 illustrates the 5G/LTE UE that is handed over based on the active MO IMS voice session.

FIG. 7 illustrates 5G UE 401 that hands over based on an active media session. UE 401 comprises an example of UE 101, although UE 101 may differ. UE 401 comprises 5GNR radio 701, LTE radio 702, and user circuitry 703. Radios 701-702 comprise antennas, amplifiers, filters, modulation, analog-to-digital interfaces, DSP, memory, and transceivers that are coupled over bus circuitry. User circuitry 703 comprises memory, CPU, user interfaces and components, and transceivers that are coupled over bus circuitry. The memory in user circuitry 703 stores an operating system, user applications (USER), Session Initiation Protocol (SIP), and 5GNR network applications for PHY, MAC, RLC, PDCP, SDAP, and RRC and LTE network applications for PHY, MAC, RLC, PDCP, and RRC. The antenna in radio 5GNR 701 is wirelessly coupled to 5G/LTE RAN 510 over a 5GNR link. The antenna in radio LTE 702 is wirelessly coupled to 5G/LTE RAN 510 over an LTE link. Transceivers in radios 701-702 are coupled to a transceiver in user circuitry 703. A transceiver in user circuitry 703 is typically coupled to the user interfaces and components like displays, controllers, and memory. The CPU in user circuitry 703 executes the operating system, PHYs, MACs, RLCs, PDCPs, SDAP, and RRCs to exchange 5GNR and LTE signaling and data with 5G/LTE RAN 410 over radios 701-702.

In radios 701-702, the antennas receive wireless signals from 5G RAN 410 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR and LTE symbols to user circuitry 703 over the transceivers. In user circuitry 703, the CPU executes the network applications to process the 5GNR and LTE symbols and recover the downlink 5GNR and LTE signaling and data. The 5GNR and LTE network applications receive new uplink signaling and data from the user applications. The network applications process the uplink user signaling and the downlink 5GNR and LTE signaling to generate new downlink user signaling and new uplink 5GNR and LTE signaling. The network applications transfer the new downlink user signaling and data to the low-latency user applications. The 5GNR and LTE network applications process the new uplink 5GNR and LTE signaling and low-latency user data to generate corresponding uplink 5GNR and LTE symbols that carry the uplink 5GNR and LTE signaling and data. In radios 701-702, the DSPs process the uplink 5GNR and LTE symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR and LTE signals to 5G/LTE RAN 410 that transport the uplink 5GNR and LTE signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs. SIP functions comprise generating SIP invite messages and processing received SIP messages.

The 5GNR RRC in UE 401 wirelessly attaches to the 5GNR RRC in CU 441 over 5G radio 701, 5G RU 411, and 5G DU 431. The 5GNR RRC in CU 401 transfers a registration request to the 5GNR RRC in CU 441 over RU 411 and DU 431. The 5GNR RRC in UE 401 receives network addressing, QoS metrics, and registration accept message from the 5GNR RRC in CU 441 over DU 431 and RU 411. The registration accept message indicates that LTE fallback is available in network core 420. The 5GNR RRC in UE 401 exchanges user signaling with the 5GNR RRC in CU 441. The 5GNR SDAP in UE 401 exchanges user data with the 5GNR SDAP in CU 441.

In response to a user application, UE 401 initiates a Mobile Originated (MO) IMS voice session and/or some other type of IMS media session. The SIP in UE 101 generates a Session Initiation Protocol (SIP) invite message to initiate the MO IMS voice session. The 5GNR SDAP in UE 401 transfers the SIP invite for IMS 425 to the 5GNR SDAP in CU 441 over RU 411 and DU 431. In some examples, UE 401 receives a SIP message to initiate a Mobile Terminal (MT) Internet Protocol Multimedia Subsystem (IMS) session. In response to sending the SIP invite and determining that LTE fallback is available, the 5GNR RRC in UE 401 directs the LTE RRC to measure RSRP and RSSI and/or some other signal metric for LTE RU 412. Advantageously, UE 401 determines signal metrics for fallback before receiving a handover command to fallback. The LTE RRC directs the LTE PHY to measure RSRP and RSSI for LTE RU 412. The LTE PHY transfers the measured RSRP and RSSI to the LTE RRC and the LTE RRC transfers the measured RSRP and RSSI to the 5GNR RRC. The 5GNR RRC determines RSRQ for LTE RU 412 based on the measured RSSI and RSRP. The 5GNR RRC generates a measurement report that indicates the RSRQ for LTE RU 412 and that indicates LTE fallback capability for UE 401. The 5GNR RRC in UE 401 transfers the measurement report to the 5GNR RRC in CU 441 over RU 411 and DU 431.

The 5GNR RRC in UE 401 receives a handover command from the 5GNR RRC in CU 441 over DU 431 and 5G RU 411. The 5GNR RRC in UE 401 transfers the handover command to the LTE RRC in UE 401. In response to the handover command, the LTE RRC in UE 401 attaches to the LTE RRC in CU 441 and the LTE PDCP in UE 401 attaches to the LTE RRC in CU 441 over LTE RU 412 and LTE DU 432. The LTE RRC in UE 401 transfers attachment signaling to the LTE RRC in CU 441 over LTE RU 412 and LTE DU 432. In response to the attachment, the LTE PDCP establishes the MO IMS voice session with IMS 425 over LTE RU 412, LTE DU 432, and 5G/LTE CU 441.

Figure 8:
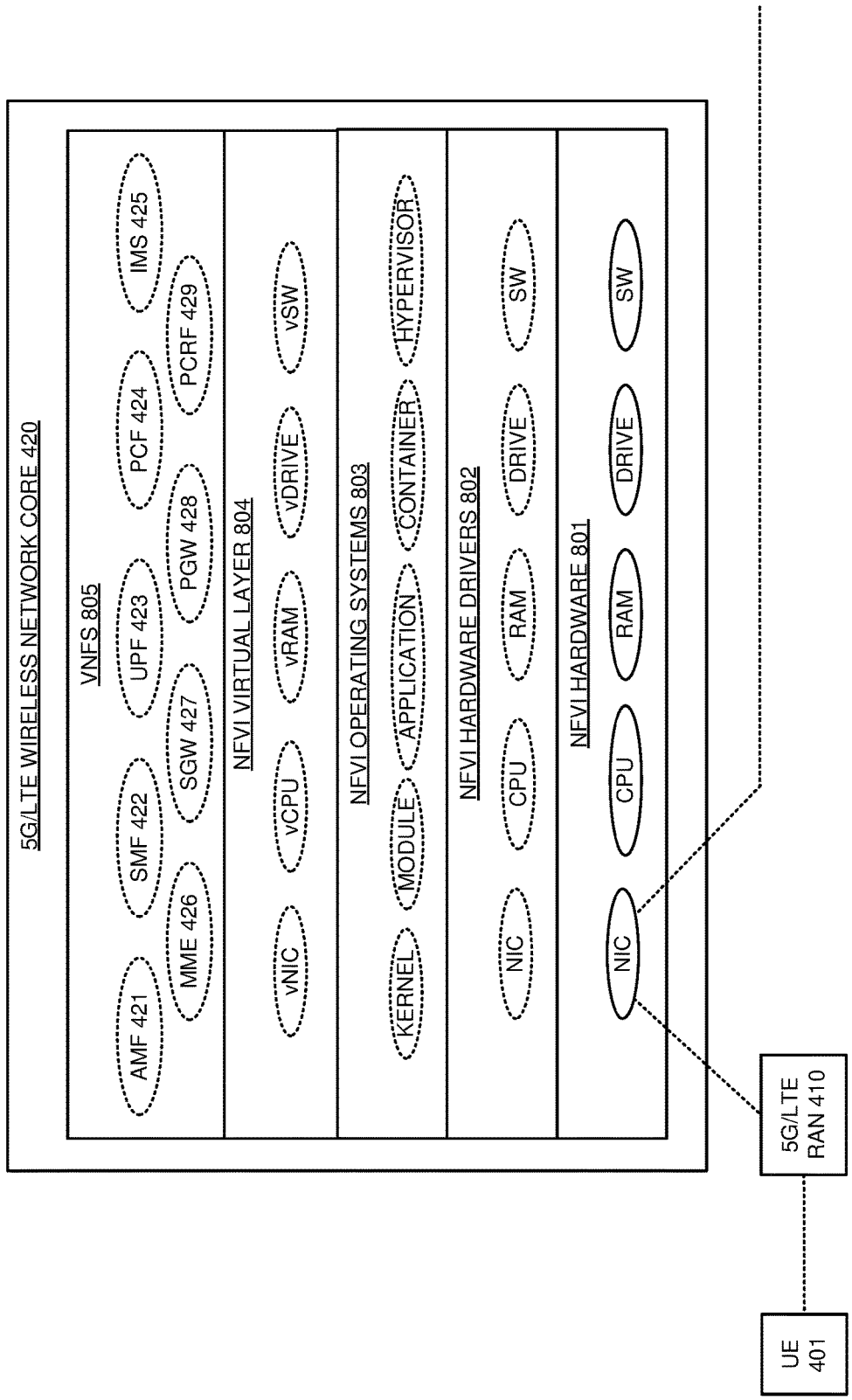
FIG. 8 illustrates a 5G/LTE wireless network core that hands over the 5G/LTE UE based on the active MO IMS voice session.

FIG. 8 illustrates 5G/LTE wireless network core 420 that hands over 5G/LTE UE 401 based on an active media session. Wireless network core 420 comprises an example of network elements 140, although network elements 140 may differ. Wireless network core 420 comprises Network Function Virtualization Infrastructure (NFVI) hardware 801, NFVI hardware drivers 802, NFVI operating systems 803, NFVI virtual layer 804, and NFVI Virtual Network Functions (VNFs) 805. NFVI hardware 801 comprises Network Interface Cards (NICs), CPU, RAM, Flash/Disk Drives (DRIVE), and Data Switches (SW). NFVI hardware drivers 802 comprise software that is resident in the NIC, CPU, RAM, DRIVE, and SW. NFVI operating systems 803 comprise kernels, modules, applications, containers, hypervisors, and the like. NFVI virtual layer 804 comprises vNIC, vCPU, vRAM, vDRIVE, and vSW. NFVI VNFs 805 comprise AMF 421, SMF 422, UPF 423, PCF 424, IMS 425, MME 426, SGW 427, PGW 428, and PCRF 429. Other VNFs like Network Slice Selection Function (NSSF), Authentication Server Function (AUSF), Unified Data Manager (UDM), Network Exposure Function (NEF), are typically present but are omitted for clarity. Wireless network core 420 may be located at a single site or be distributed across multiple geographic locations. The NIC is coupled to CU 441 in 5G/LTE RAN 410 and to external systems. NFVI hardware 801 executes NFVI hardware drivers 802, NFVI operating systems 803, NFVI virtual layer 804, and NFVI VNFs 805 to serve UE 401 over 5G RAN 410.

Figure 9:
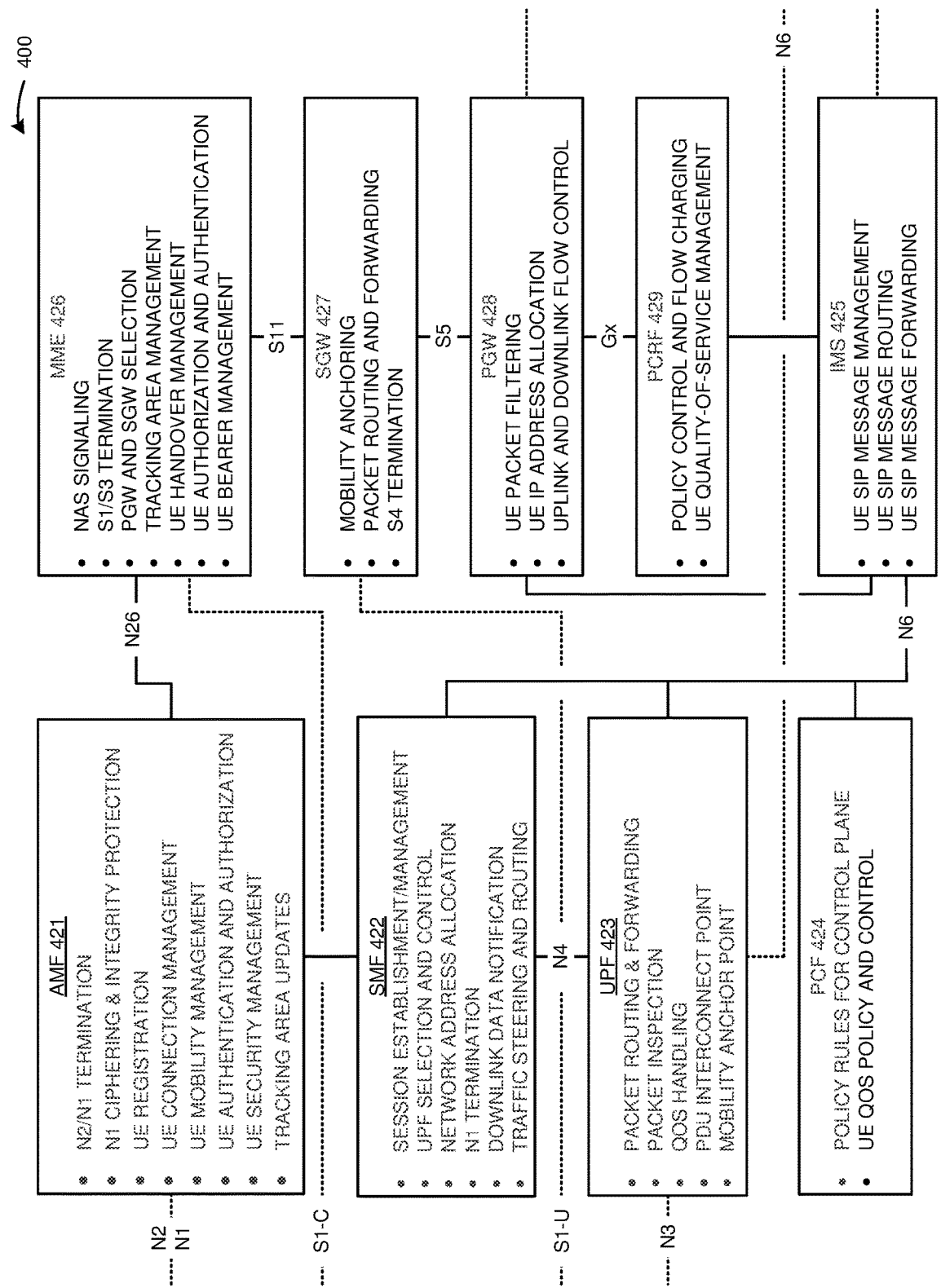
FIG. 9 illustrates a 5G/LTE wireless network core that hands over the 5G/LTE UE based on the active MO IMS voice session.

FIG. 9 further illustrates 5G/LTE wireless network core 420 that hands over 5G/LTE UE 401 based on an active media session. AMF 421 performs N2/N1 termination, N1 ciphering & integrity protection, UE registration, SMF/PCF selection, UE connectionimohihty management, UE authentication and authorization, UE security management, and tracking area updates. SNIP 422 performs session establishment/management, network address allocation, N1 termination, downlink data notification, and traffic steering and routing. UHF 423 performs packet routing & forwarding, packet inspection, QoS handling, PDU interconnection, and mobility anchoring. PCF 424 distributes UE policies to the control plane and controls UE Quality-of-Service (QoS). IMS 425 performs UE SIP message management, UE SIP message routing, and UE SIP message forwarding. MME 426 performs S1/S3 termination, PGW and SGW selection, tracking area management, UE handover management, UE authorization and authentication, and UE radio bearer management. SGW 427 performs UE mobility anchoring, packet routing and forwarding, and S4 termination, PGW 428 performs UE packet filtering, UE IP address allocation, and uplink/downlink flow control, and PCRF performs policy control and flow charging and UE QoS management. Although not shown for clarity, a Network Slice Selection Function (NSSF) performs slice discovery, AMF discovery, slice authorization, and slice prioritization. An Authentication Server Function (AUSF) performs UE authentication with Authentication and Key Agreement. (AKA) credentials and handles UE authorizations. A User Data Management (UDM) handles UE context, UE subscription data, and UE authentication keys. A Network Repository Function (NRF) performs network function authentication and authorization, selection, security, and event registration/subscriptions.

In operation, CU 441 requests wireless data service for UE 401 from AMF 421 and transfers a registration request message for UE 401 to AMF 421. AMF 421 interacts other network functions to authenticate and authorize UE 401 for wireless data services. Responsive to the authentication and authorization, AMF 421 interacts with other network functions to select Quality-of-Service (QoS) metrics and network addresses for UE 401. AMF 421 determines that an N26 link to MME 426 is available and in response, determines LTE fallback is available in 5G/LTE network core 420. AMF 421 transfers the network addresses, QoS metrics, and a registration accept message for UE 401 to CU 441. The registration accept message indicates that LTE fallback is available.

CU 441 transfers SIP invite message from UE 441 to UPF 423. The SIP invite indicates that UE 401 initiated a MO IMS voice session. UPF 423 transfers the SIP invite to IMS 425. In response to SIP invite sent by UE 401, IMS 425 notifies PCF 424 of the MO IMS voice session initiated by UE 401. PCF 424 notifies SMF 422 and UPF 423 of the MO IMS voice session and SMF 422 notifies AMF 421. AMF 421 transfers a Packet Data Unit (PDU) session resource modification request to CU 441 to establish the MO IMS voice session for UE 401.

CU 441 rejects the session resource modification request and transfers a handover required message to AMF 421. AMF 421 receives the handover required message from CU 441. The handover required message indicates a PCI for the LTE RRC in CU 441 as the handover target. AMF 421 transfers a handover request to MME 426 over N26 links to hand over UE 401. MME 426 transfers a handover request to CU 441. CU 441 accepts the handover request and transfers a handover acceptance message to MME 426. MME 426 forwards the handover acceptance to AMF 421 and AMF 421 transfers a handover command for UE 401 to CU 441. CU 441 transfers the handover command to UE 401 and UE 401 reattaches to CU 441 over LTE RU 412 and LTE DU 432. CU 441 notifies MME 426 of the attachment. MME 426 interacts with SGW 427, PGW 428, and PCRF 429 to select Quality-of-Service (QoS) metrics and network addresses for UE 401 to establish the MO IMS voice session. In response, UE 401 establishes the MO IMS voice session with IMS 425 over LTE RU 412.

Figure 10:
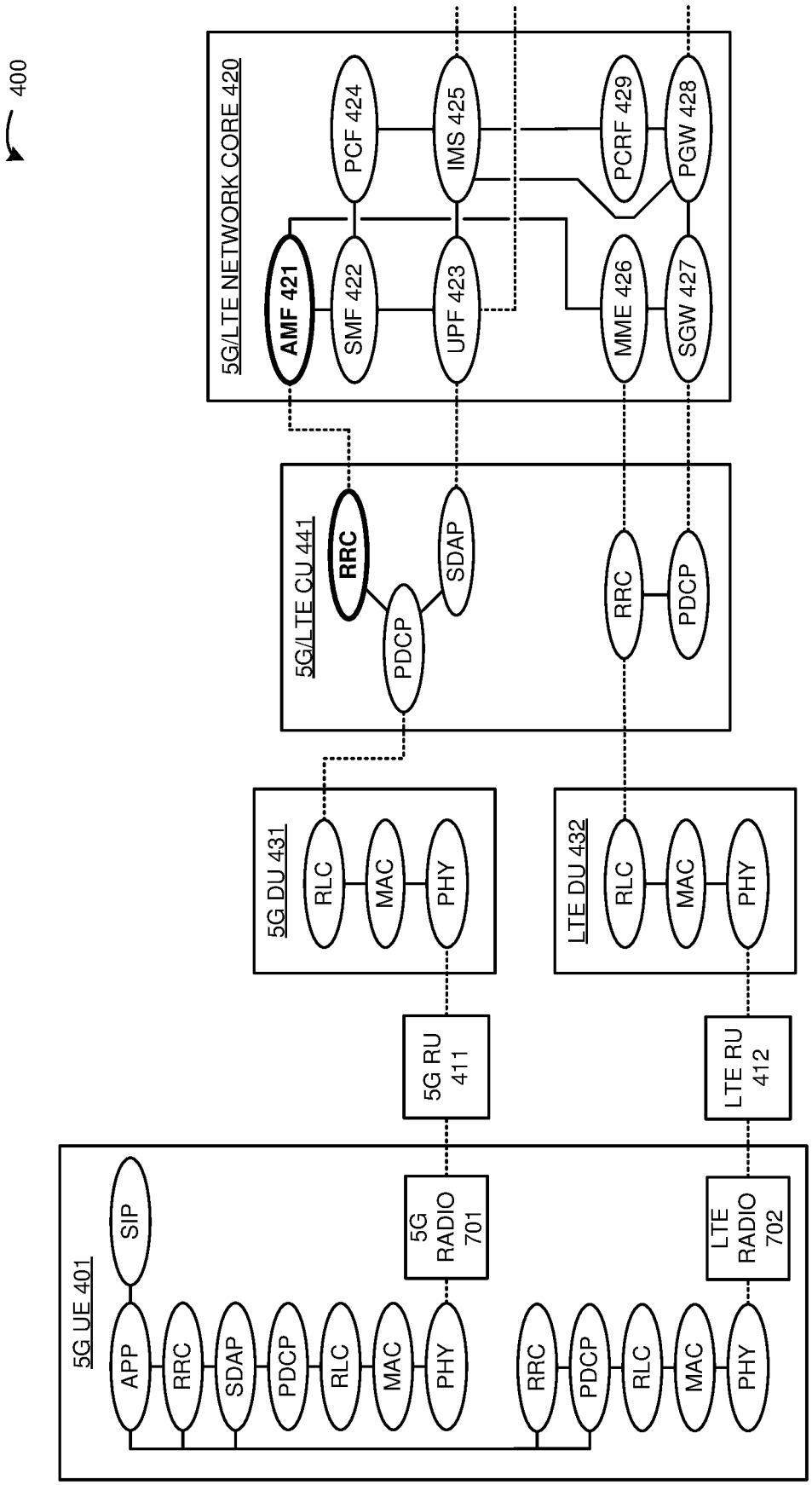
FIG. 10 illustrates the operation of the 5G/LTE communication network to hand over the 5G/LTE UE based on the active MO IMS voice session.

FIG. 10 illustrates the operation of 5G communication network 400 and 5G UE 401 to determine signal metrics for selected resource blocks. The operation is exemplary and may vary in other examples. In response to a user application, the 5GNR RRC in UE 401 wirelessly attaches to the 5GNR RRC in CU 441. The 5GNR RRC in UE 401 transfers a registration request to the 5GNR RRC in CU 441 over the 5GNR PDCPs, RLCs, MACs, and PHYs. The 5GNR RRC in CU 441 transfers a registration request message for UE 401 to AMF 421. AMF 421 interacts other network functions to authenticate and authorize UE 401 for wireless data services. Responsive to the authentication and authorization, AMF 421 interacts with other network functions to select Quality-of-Service (QoS) metrics and network addresses for UE 401. AMF 421 determines that an N26 link to MME 426 is available and determines LTE fallback is available based on the available N26 links. AMF 421 transfers the network addresses, QoS metrics, and a registration accept message for UE 401 to the 5GNR RRC in CU 441. The registration accept message indicates that AMF 421 can perform LTE fallback. Th 5GNR RRC in CU 441 transfers the network addressing, QoS metrics, and registration accept message to the 5GNR RRC in UE 401 over the 5GNR PDCPs, RLCs, MACs, and PHYs. The 5GNR RRC in CU 441 controls the 5GNR SDAP, PDCP, RLC, MAC, and PHY to serve UE 401.

A user application in UE 401 initiates a Mobile Originated (MO) IMS voice session. The SIP in UE 401 generates a SIP invite and the 5GNR SDAP in UE 401 transfers the SIP invite to the SDAP in CU 441 over the 5GNR PDCPs, RLCs, MACs, and PHYs. The 5GNR SDAP in CU 441 transfers the SIP invite message to UPF 423. UPF 423 transfers the SIP invite to IMS 425. In response to sending the SIP invite and receiving the indication that AMF 421 can perform LTE fallback, the 5GNR RRC in UE 401 directs the LTE RRC in UE 401 to measure Reference Signal Received Power (RSRP) and Reference Signal Strength Indication (RSSI) for LTE RU 412. The LTE RRC in UE 401 directs the LTE PHY in UE 401 to measure RSRP and RSSI for LTE RU 412. The LTE PHY measures the RSRP and RSSI and transfers the measurements to the LTE RRC in UE 401. The LTE RRC transfers the measured RSRP and RSSI to the 5GNR RRC in UE 401. The 5GNR RRC determines Reference Signal Received Quality (RSRQ) for LTE RU 412 based on the RSSI and RSRP. The 5GNR RRC in UE 401 generates a measurement report that indicates the RSRQ for LTE RU 412 and that indicates LTE fallback capability for UE 401. The 5GNR RRC in UE 401 wirelessly transfers the measurement report to the 5GNR RRC in CU 441 over the 5GNR SDAPs, PDCPs, RLCs, MACs, and PHYs. In response to SIP invite sent by UE 401, IMS 425 notifies PCF 424 of the MO IMS voice session initiated by UE 401. PCF 424 notifies SMF 422 and UPF 423 of the MO IMS voice session and SMF 422 notifies AMF 421. AMF 421 transfers a Packet Data Unit (PDU) session resource modification request to the 5GNR RRC in CU 441 to establish the MO IMS voice session for UE 401.

The 5GNR RRC in CU 441 receives the measurement report that indicates the RSRQ for LTE RU 412 and the LTE fallback capability for UE 401. The 5GNR RRC in CU 441 receives the session resource modification request from AMF 421 to establish the MO IMS voice session for UE 401. The 5GNR RRC in CU 441 determines that the RSRQ for RU 412 exceeds a quality threshold. In response to the excessive RSRQ for LTE RU 412, the LTE fallback capability for UE 401, and the session resource modification request from AMF 421, the 5GNR RRC in CU 441 rejects the session resource modification request and transfers a handover required message for UE 401 to AMF 421. The handover required message indicates a PCI for the LTE RRC in CU 441 as the handover target. AMF 421 transfers a handover request to MME 426 over N26 links to hand over UE 401.

MME 426 transfers a handover request to the LTE RRC in CU 441. The LTE RRC in CU 441 accepts the handover request and transfers a handover acceptance message to MME 426. MME 426 forwards the handover acceptance to AMF 421 and AMF 421 transfers a handover command to the 5GNR RRC in CU 441. The 5GNR RRC in CU 441 transfers the handover command to the 5GNR RRC in UE 401 over the 5GNR SDAPs, PDCPs, RLCs, MACs, and PHYs. The 5GNR RRC in UE 401 receives the handover command and transfers the handover command to the LTE RRC in UE 401. The LTE RRC in UE 401 attaches to the LTE RRC in CU 441 over the LTE PDCPs, RLCs, MACs, and PHYs. The LTE RRC in CU 441 notifies MME 426 of the attachment. MME 426 interacts with SGW 427, PGW 428, and PCRF 429 to select Quality-of-Service (QoS) metrics and network addresses for UE 401 to establish the MO IMS voice session. In response, the LTE PDCP in UE 401 establishes the MO IMS voice session with IMS 425 over the LTE RLCs, MACs, and PHYs.

The wireless data network circuitry described above comprises computer hardware and software that form special-purpose circuitry to hand over a wireless UE based on an active media session. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose circuitry to hand over a wireless UE based on an active media session.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to hand over a wireless User Equipment (UE) from a source access node to a target access node, the method comprising:

the wireless UE identifying an active media session, a UE fallback capability, and a network fallback availability, and in response to the identifying and without instruction or request from another network element, measuring a signal metric for the target access node and wirelessly transmitting the signal metric and the UE fallback capability to the source access node;

the source access node wirelessly receiving the indication of the signal metric and the UE fallback capability from the wireless UE and receiving an access modification message for the UE from a wireless network controller, and in response, initiating the hand over based on the signal metric, the UE capability, and the access modification message and transferring a handover message to the wireless network controller; and the wireless network controller receiving the handover message, transferring a handover request to the target access node, receiving a handover acceptance from the target access node, and transferring a handover command for the wireless UE to the source access node.

2. The method of claim 1 wherein the wireless UE identifying the active media session comprises wirelessly transmitting a Session Initiation Protocol (SIP) invite for a Mobile Originated (MO) Internet Protocol Multimedia Subsystem (IMS) session.

3. The method of claim 1 wherein the wireless UE identifying the active media session comprises wirelessly receiving a Session Initiation Protocol (SIP) message to initiate a Mobile Terminal (MT) Internet Protocol Multimedia Subsystem (IMS) session.

4. The method of claim 1 wherein the wireless UE identifying the network fallback availability comprises the wireless UE wirelessly receiving a Radio Resource Control (RRC) reconfiguration message from the source access node that indicates Long Term Evolution (LTE) fallback.

5. The method of claim 1 wherein the source access node wirelessly receiving the indication of the signal metric, the UE fallback capability, the access modification message for the UE, and in response, initiating the hand over and transferring the handover message comprises executing a Fifth Generation New Radio (5GNR) Radio Resource Control and the 5GNR RRC receiving the indication of the signal metric, the UE fallback capability, the access modification message for the UE, and in response, initiating the hand over and transferring the handover message.

6. The method of claim 1 wherein the wireless network controller comprises a Fifth Generation Core (5GC) Access and Mobility Management Function (AMF).

7. The method of claim 1 wherein the wireless network controller receiving the handover message, transferring the handover request, receiving the handover acceptance, and transferring the handover command comprises a Fifth Generation Core (5GC) Access and Mobility Management Function (AMF) receiving the handover message, transferring the handover request, receiving the handover acceptance, and transferring the handover command.

8. The method of claim 1 wherein the source access node receiving the access modification message comprises receiving an N2 Packet Data Unit (PDU) Session Resource Modification Request.

9. The method of claim 1 further comprising:
the source access node wirelessly transferring the handover command to the wireless UE;
the wireless UE wirelessly receiving the handover command, and in response, attaching to the target access node and establishing an Internet Protocol Multimedia Subsystem (IMS) session over the target access node.

10. The method of claim 1 wherein the source access node comprises a Fifth Generation Radio Access Network (5G RAN) and the target access node comprises a Long Term Evolution (LTE) RAN.

11. A wireless communication network to hand over a wireless User Equipment (UE) from a source access node to a target access node, the wireless communication network comprising:
- the wireless UE configured to identify an active media session, a UE fallback capability, and a network fallback availability, and in response to the identification and without instruction or request from another network element, measure a signal metric for the target access node and wirelessly transfer the signal metric and the UE fallback capability to the source access node;
- the source access node configured to wirelessly receive the indication of the signal metric and the UE fallback capability from the wireless UE and receive an access modification message for the UE from a wireless network controller, and in response, initiate the hand over based on the signal metric, the UE capability, and the access modification message and transfer a handover message to the wireless network controller; and
- the wireless network controller configured to receive the handover message, transfer a handover request to the target access node, receive a handover acceptance from the target access node, and transfer a handover command for the wireless UE to the source access node.

12. The wireless communication network of claim 11 wherein the wireless UE is configured to identify the active media session by identifying a wireless transmission of a Session Initiation Protocol (SIP) invite for a Mobile Originated (MO) Internet Protocol Multimedia Subsystem (IMS) session.

13. The wireless communication network of claim 11 wherein the wireless UE is configured to identify the active media session by identifying the wireless reception of a Session Initiation Protocol (SIP) message to initiate a Mobile Terminal (MT) Internet Protocol Multimedia Subsystem (IMS) session.

14. The wireless communication network of claim 11 wherein the wireless UE is configured to identify the network fallback availability by wirelessly receiving a Radio Resource Control (RRC) reconfiguration message from the source access node that indicates Long Term Evolution (LTE) fallback.

15. The wireless communication network of claim 11 wherein the source access node comprises a Fifth Generation New Radio (5GNR) Radio Resource Control configured to receive the indication of the signal metric, the UE fallback capability, the access modification message for the UE, and in response, initiate the hand over and transfer the handover message.

16. The wireless communication network of claim 11 wherein the wireless network controller comprises a Fifth Generation Core (5GC) Access and Mobility Management Function (AMF).

17. The wireless communication network of claim 11 wherein the wireless network controller comprises a Fifth Generation Core (5GC) Access and Mobility Management Function (AMF) configured to receive the handover message, transfer the handover request, receive the handover acceptance, and transfer the handover command.

18. The wireless communication network of claim 11 wherein the access modification message comprises an N2 Packet Data Unit (PDU) Session Resource Modification Request.

19. The wireless communication network of claim 11 further comprising:
- the source access node configured to wirelessly transfer the handover command to the wireless UE;
- the wireless UE configured to wirelessly receive the handover command, and in response, attach to the target access node and establish an Internet Protocol Multimedia Subsystem (IMS) session over the target access node.

20. The wireless communication network of claim 11 wherein the source access node comprises a Fifth Generation Radio Access Network (5G RAN) and the target access node comprises a Long Term Evolution (LTE) RAN.

* * * * *